Jan. 9, 1923. 1,441,310.
W. G. THOMAS.
MOTOR CONTROL.
FILED APR. 21, 1920. 3 SHEETS—SHEET 1.

INVENTOR
Winthrop G. Thomas
BY
Sheffield Betts
ATTORNEYS

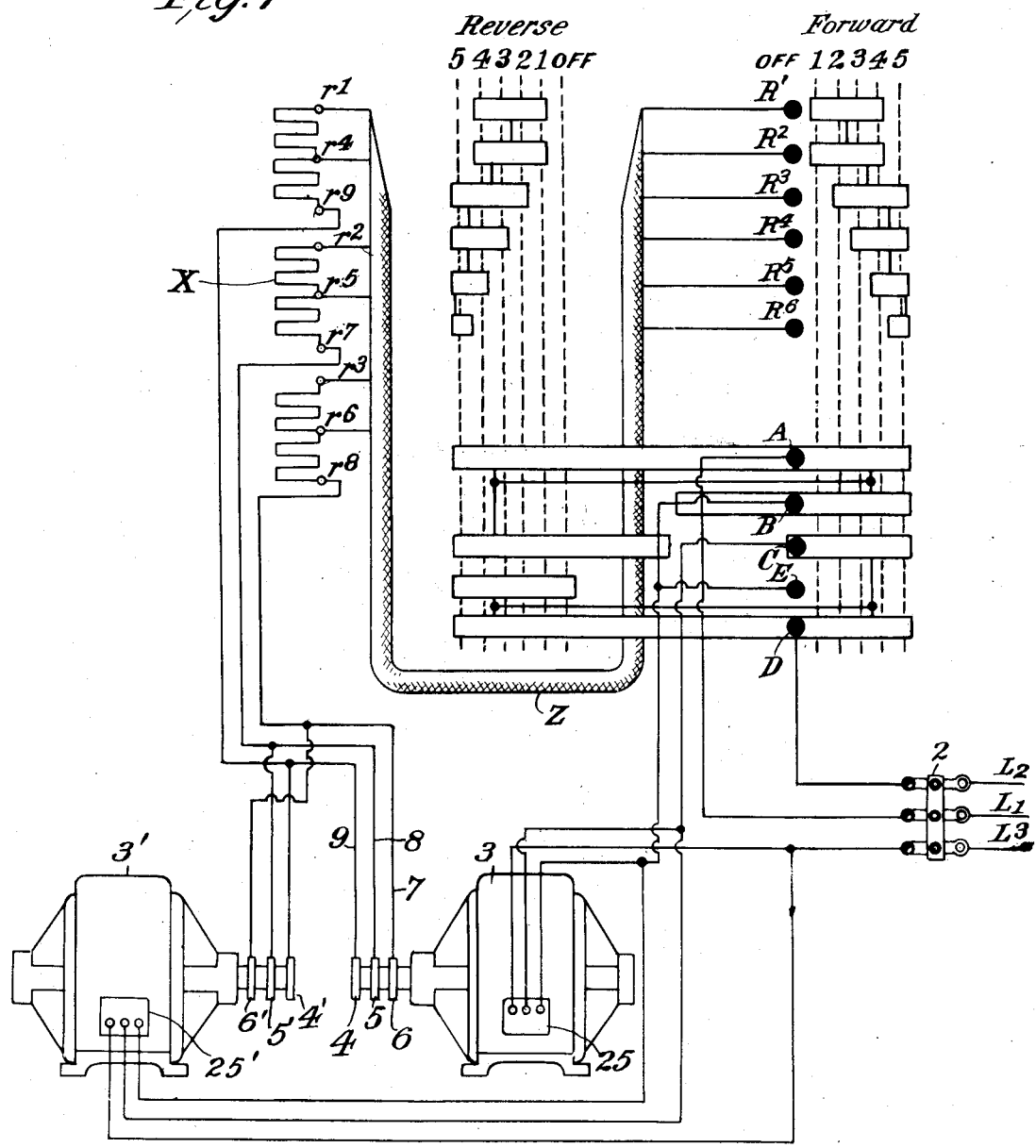
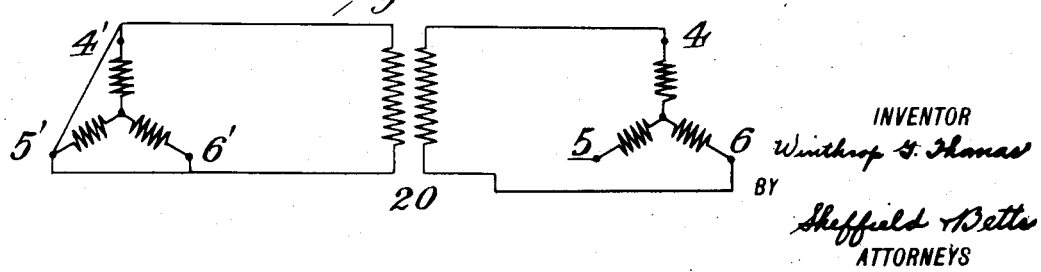

Patented Jan. 9, 1923.

1,441,310

UNITED STATES PATENT OFFICE.

WINTHROP G. THOMAS, OF NEW YORK, N. Y.; WEBBER WILLIAMS THOMAS EXECUTRIX OF SAID WINTHROP G. THOMAS, DECEASED.

MOTOR CONTROL.

Application filed April 21, 1920. Serial No. 375,603.

*To all whom it may concern:*

Be it known that I, WINTHROP G. THOMAS, a citizen of the United States, and a resident of New York, New York County, State of New York, have invented certain new and useful Improvements in Motor Controls, of which the following is a description.

My invention relates to the operation of alternating current motors.

The principal object of my invention is to provide a simple and reliable method of operating alternating current motors which will maintain the rotors locked together electrically without the necessity for mechanical interconnection.

It is frequently desired to lock the rotors of two motors together electrically so that there will be a fixed relation between the rotors when it is not desired to connect them mechanically, as by a common shaft or by gears, owing to the distance between the motors, the necessity of using one motor with each of a plurality of others as desired, or other considerations.

According to my invention, the field windings, usually the stator windings, of two or more motors of the polyphase induction type having phase wound rotors, are connected permanently in parallel and the armature windings, usually the rotor windings, are also connected permanently, the armature windings being so arranged that the electromotive forces are opposed and hence no current flows in the armatures or in the leads between them unless special arrangements are provided to permit of such current flow. Under the condition of no current flow, there is no torque on the rotors and consequently I make use of this condition when I desire the motors to stand still, it being desirable to interrupt the connection with the supply only when putting the apparatus aside for a relatively long period, as for the night. While at a standstill although there is no rotative torque the rotors resist being pulled apart, a very slight movement of one rotor away from the electrical position of the other rotor causing currents to flow between the two rotors which pull them together again so that all the rotors occupy the same position with relation to their fields.

In order to start a load, a non-inductive resistance is connected with the armature or induced circuits in such a way as to permit armature currents to flow and thus to generate torque for accelerating purposes. The starting resistance is so used, however, that the interconnections between the armatures are not shifted at all or their resistance increased. Consequently, the armatures are free to exchange currents to resist being pulled out of step during starting or running equally well as to resist being pulled apart when standing still.

The novel features of my invention are pointed out with particularity in the appended claims. The invention itself, however, with further objects and advantages, will best be understood by reference to the following description taken in connection with the accompanying drawing in which:

Fig. 7 is a view, partly diagrammatic, of a pair of motors arranged to operate as described in connection with Figs. 1, 2, and 3 and illustrating the preferred arrangement of drum controller for carrying out such a method of operation.

Fig. 8 is modified arrangement according to my invention illustrating the use of a transformer in the tie lines between motors.

Figure 1:
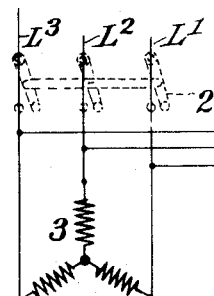
Fig. 1 illustrates two induction motors in diagram electrically connected according to my invention to resist being pulled apart but developing no torque.
Figure 1:
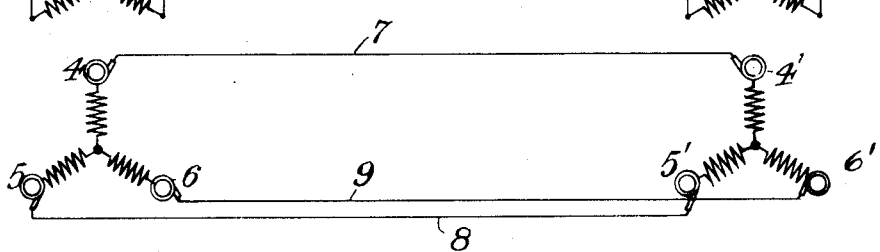
Figure 2:
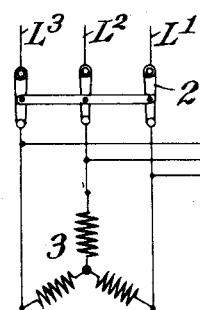
Fig. 2 is a diagram of the motors of Fig. 1 as arranged for starting.
Figure 2:
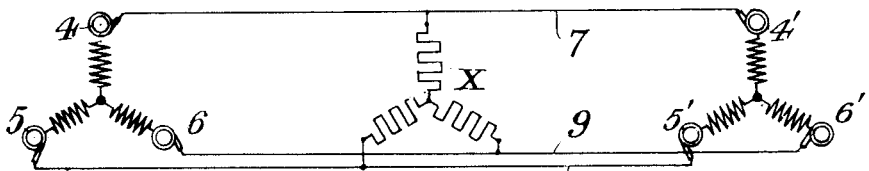
Figure 3:
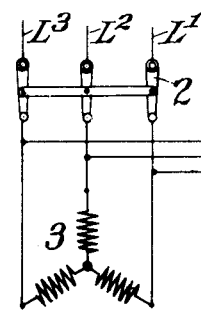
Fig. 3 is a diagram of the motors of Fig. 1 as arranged for running.
Figure 3:
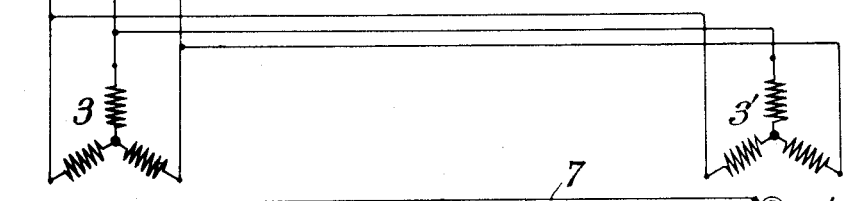
Figure 3:
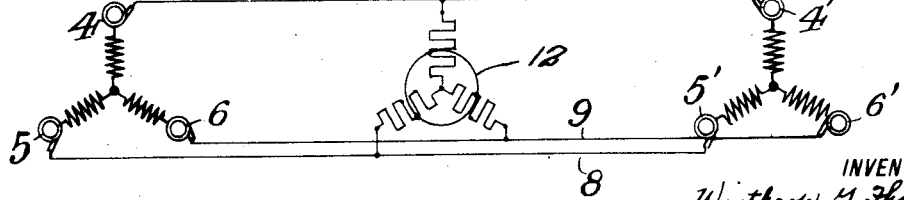

Referring in detail to Figs. 1, 2, and 3, $L^1$, $L^2$, $L^3$, are lines from a source of polyphase current, preferably three phase, and 2 is a disconnecting switch therefor. The two motors are designated as 3 and 3', respectively, and are shown as having their stators connected in multiple to the source of supply. The rotors of these motors are of the phase wound type and the rotor windings will be understood to be connected in the usual manner to slip rings. The rings of motor 3 are indicated at 4, 5 and 6, while the corresponding rings of motor 3' are indicated at 4', 5' and 6', respectively.

The rings on motor 3 are permanently connected to those on motor 3', rings 4, 5 and 6 being shown as connected to rings 4', 5' and 6', respectively, by means of leads 7, 8 and 9.

The rotors being once so connected and voltage being applied thereto, currents will flow in lines 7, 8 and 9, causing the rotors of the motors 3 and 3' to move into such positions that each rotor will occupy the same position relative to its stator. In other words, the rotors will occupy such positions that the voltage induced in one rotor will oppose and neutralize those in the other and there will be no current flow through the leads 7, 8 and 9. Under these conditions, neither of the motors will develop torque in spite of the fact that their fields are excited, but they will resist being pulled apart.

In order to start both motors under load and at the same time maintain their rotors in step, it is necessary only to connect a resistance, such as X (Fig. 2) between the leads 7, 8 and 9. For normal running part of the resistance may be shunted, as indicated at 12 in Fig. 3, but a minimum amount must be retained in order to prevent the motors being pulled out of step by an unbalancing of the load, the amount of resistance retained depending on the amount of unbalanced load anticipated. In case it is desided to reverse the rotation of only one of the motors, as in Figs. 1, 2 and 3, it is necessary to interchange the connections of two of the rotor leads as well as the connections of two of the stator leads of the motor in question.

Of course, if it is desired to reverse both motors 3 and 3' at the same time, it is necessary only to interchange or reverse the connections of two of the stator leads, such as 1, as is common when reversing a single induction motor.

Figure 4:
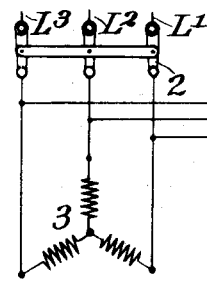
Fig. 4 illustrates two induction motors in diagram electrically connected according to my invention to resist being pulled apart but developing no torque, the arrangement of Fig. 4 differing from that of Fig. 1 in the number of tie lines between the induced windings.
Figure 4:
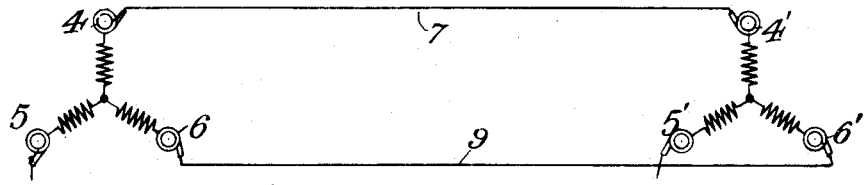
Figure 5:
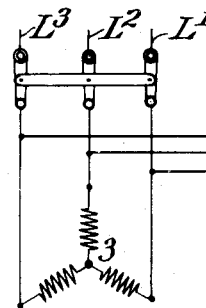
Fig. 5 is a diagram of the motors of Fig. 4 as arranged for starting.
Figure 5:
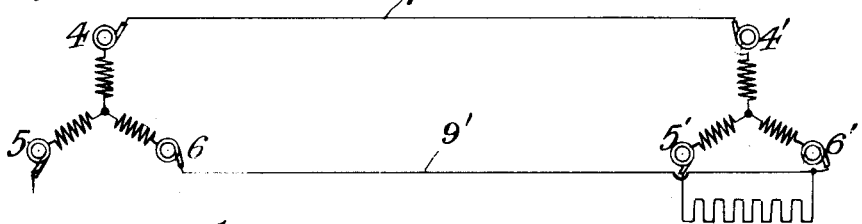
Figure 6:
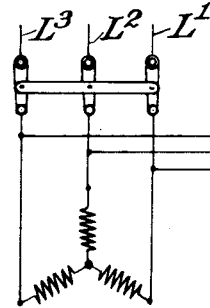
Fig. 6 is a diagram of the motors of Fig. 4 as arranged for running.
Figure 6:
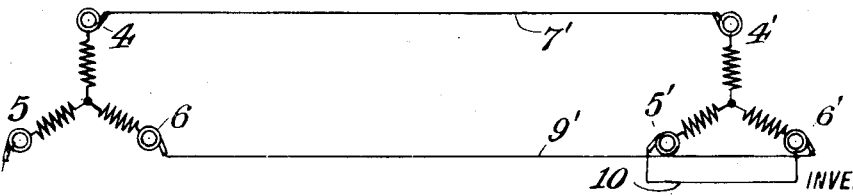

In Figs. 4, 5 and 6, I have illustrated an arrangement of motors according to my invention in which only two tie lines, such as 7' and 8', are used between the induced or armature windings of the two machines. I have illustrated line 7' as connected between rings 4 and 4' of motors 3 and 3', while line 8' connects rings 6 and 6', the motors being illustrated as identical in the two arrangements.

In the arrangement of Figs. 4, 5 and 6, the field of both motors is continuously excited unless they are shut down for a relatively long time and the rotors resist being pulled apart when standing still in this arrangement as well as in that of Figs. 1, 2 and 3.

In order to start the motors under load, it is now necessary only to connect a resistance, such as 19, across one of the phases of either motor other than the one connected to tie lines 7' and 8'. Thus the resistance 19 may be connected between ring 5' of motor 3' and either of rings 4' and 6', and it may be connected between ring 5 of motor 3 and either ring 4 or ring 6. In Fig. 5 I have shown the resistance 19 connected across rings 5' and 6'. The motors will now accelerate under load, remaining in step. As their speed increases the resistance Y may be shunted by degrees until the rings 5' and 6' are connected by a low resistance or short-circuiting path 10. (Fig. 6). The motors 3 and 3' will now continue to run in step, each carrying load and will successfully resist being pulled apart, under conditions commonly met with in practice. If load be applied to both motors in substantially equal amounts, they will develop overload torque without falling out of step and the same is true if the motor having one phase short circuited, motor 3' as shown is loaded in excess of the other. However, I find that the sudden application to motor 3 of a load in considerable excess of that applied to or being carried by motor 3' will cause the motor to pull apart or fall out of step. In the arrangement of Figs. 1, 2, and 3, the excess load can be applied to either motor, as desired. In the arrangements of Figs. 4, 5, and 6, I find that the direction of rotation of one motor may be reversed with respect to that of the other by merely interchanging two of the power leads of the motor in question, no change being necessary in the connections of the tie lines 7' and 8'.

Referring to Fig. 7, I have shown therein the motors 3 and 3' connected for operation according to the arrangement of Figs. 1, 2, and 3, and controlled by means of a drum controller 20 illustrated by a developed diagram. Assuming that the controller is on the neutral forward position, the motors are connected as in Fig. 1 and the circuits may be traced as follows: $L^1$ through switch 2 to contact A of the controller 20, thence to contact B and thence to the connection plates 25 and 25' of motors 3 and 3', respectively. Power lead $L^2$ goes to contact D, thence to contact C of controller 20, and thence to connection plates 25 and 25'. Power lead $L^3$ goes direct to plates 25 and 25' without passing through the controller 20. It will be seen that the fields of motors 3 and 3' are excited so long as switch 1 is closed, all three phases being continued through the controller when standing on neutral. The connections of the line wires are not altered as the controller is turned from neutral to positions 1, 2, 3, 4, and 5, in the direction for forward running of motors. On neutral, however, the resistance X is disconnected. On step 1 of the controller a circuit is found running from the tie line 9 to point $r^8$ on one arm of resistance X, thence through the arm or the resistance in question to point $r^1$, thence through cable Z to contact finger $R^1$ of controller 20, thence through the drum contacts to contact finger $R^2$ through cable Z to point $r^2$, through a second resistance unit to point $r^7$ and thence to tie line 8. The resistance is thus connected across only one phase of the motor secondaries at the instant of starting, this being the preferred arrangement. On the second step forward, however, a circuit is formed running from lead 7 to point $r^8$ on the third resistance unit, thence through the third resistance unit to point $r^3$, thence through the cable Z to contact finger $R^3$, and thence through the drum contacts to contact fingers $R^2$ and $R^1$, the three resistance units being now connected in "Y" or "Star" across the three tie lines 7, 8, and 9. Successive movements of the drum of controller 20 will be seen to reduce the resistance across the tie lines, but not to reduce it to zero.

On reverse, lines $L^1$ and $L^2$ are first interchanged by the drum contacts, there being preferably two neutral positions of the controller in which the field windings stand under voltage. The construction of the controller 20 as to the remainder of its portion for reverse running is also similar to that of the portion for forward running, and its operation need not be separately described.

Referring particularly to Fig. 8, I have illustrated therein a variation or modification of the arrangement of Figs. 4, 5, and 6, the arrangement of Fig. 8 having a current transformer 20 whose primary is connected across one pair of rings such as 4' and 6' of one motor and whose secondary is connected across the corresponding pair of rings such as 4 and 6 on the other motor. In Fig. 8, I have illustrated only the secondaries of the motors, the arrangement of the primary windings being the same as that of Figs. 1, 2, 3, and Figs. 4, 5, 6. According to this arrangement, the induced windings of one motor may be entirely short-circuited in the running position, as by leads 21 and 22 in addition to the primary of the current transformer 20, thus permitting development of full torque at full speed on the motor so short-circuited, both motors, however, remaining coupled together irrespective of their speed. This arrangement is particularly well adapted for use where there is a great difference in size between the motors, as when one motor is used merely to indicate the position of the other. Transformers may also be used in the tie lines 7, 8, and 9, of Fig. 3, or 7' and 9' of Fig. 6.

It will be seen that my controller is similar in its broad aspects to those in ordinary use and that its construction will be clear to those skilled in this art from the diagrammatic representation of it shown in Fig. 2.

As clearly appears on Fig. 7, in moving the controller from forward to reverse, the fixed contact C makes contact with the reversing movable drum contact before the fixed contact B passes out of contact with the forward running movable drum contact, whereby the current is maintained in one phase of the motors 3 and 3' during the act of reversing. It is apparent, also, that there is no neutral position between the two off positions shown in this figure, the fields being fully excited as to all phases in both of the off positions, but the connections of one phase being reversed within one of these off positions as compared with the other.

It will be understood that I desire to maintain a rotating field on my motors continuously so long as they are required to be locked together electrically. While this condition of rotating field is necessarily interrupted when changing the connections from position for forward running to that for reverse running, I interrupt it as short a time as possible, providing no point of rest for the movable element of the controller in a position in which all the power leads are not connected to the motor. However, I do not preclude myself from interrupting the power supply provided mechanical means is employed to prevent the rotors from drifting apart when the power is interrupted, nor do I preclude myself from running the motors independently at times, provided means is provided whereby they may be brought into suitable relative position before being connected to operate according to my method as above described.

While I have illustrated and described my invention as applied to three-phase motors, it is not limited thereto, but may be applied to any motor of the rotating field type. It will be understood further that the type of motor employed, whether two phase, three phase, or split phase, or whether connected in "star" or "delta", is immaterial to my invention.

The operation of induction motors according to my invention will be clear from the foregoing, but it will be seen, in particular, that I do not need to open my power leads or my rotor leads in starting or stopping and consequently that the necessary number of operations and the apparatus necessary for carrying them out, are reduced to a minimum.

Having thus described my invention, I claim:

1. A system of motor control comprising in combination a plurality of non-synchronous motors and a single controller for said motors, said controller having two non-running positions and a plurality of running positions for both forward and reverse, said non-running positions being adjacent, and the field connections of the motors being reversed in one of said non-running positions as compared to the other.

2. A system of motor control comprising in combination a plurality of non-synchronous motors and a single controller for said motors, said controller having two non-running positions and a plurality of running positions for both forward and reverse, said running positions being adjacent, the field connections of the motors being reversed in one of said non-running positions as compared to the other, and the exciting current being maintained on said motors in both of said non-running positions.

3. A drum controller for controlling a plurality of polyphase motors comprising in combination means adapted to maintain polyphase voltage on the motor fields in both running and non-running positions, and means for reversing the direction of rotation of the field of the motors while maintaining excitation of at least one phase.

4. A system of motor control comprising in combination a plurality of non-synchronous polyphase motors connected to a common controller, said controller being arranged to maintain polyphase voltage on the fields of said motor in both running and non-running positions, said controller having means for reversing the fields of said motors and having no neutral position and being arranged to maintain excitation of at least one phase during reversal.

5. A system of motor control comprising in combination a plurality of non-synchronous motors and a single controller for said motors, said controller having two non-running positions and a plurality of running positions, and field connections of the motors being reversed in one of said non-running positions as compared to the other.

6. A system of motor control comprising in combination a plurality of non-synchronous motors mechanically separated and a single controller for said motors, said controller having a non-running position and a plurality of running positions for both forward and reverse thereon, said forward running positions being on the opposite side of said non-running position from said reverse running positions and the resistance steps for both forward and reverse being graduated so that the higher resistance is in circuit at the step nearer the non-running position.

7. A system of motor control comprising in combination a plurality of non-synchronous motors mechanically separated and a single controller for said motors, said controller having a non-running position and a plurality of running positions for both forward and reverse, all of which have resistance in circuit, said forward running positions being on the opposite side of said non-running position from said reverse positions and the resistance steps for both forward and reverse being graduated so that the higher resistance is in circuit at the step nearer the non-running position, said controller comprising means whereby polyphase fields are normally maintained on said motors during both running and non-running positions.

WINTHROP G. THOMAS.